(12) United States Patent
Page

(10) Patent No.: US 11,396,365 B2
(45) Date of Patent: Jul. 26, 2022

(54) DRAG RECOVERY SCHEME USING BOUNDARY LAYER INGESTION

(71) Applicant: Blended Wing Aircraft, Inc., Orange, CA (US)

(72) Inventor: Mark Allan Page, Orange, CA (US)

(73) Assignee: Blended Wing Aircraft, Inc., Orange, CA (US)

(*) Notice: Subject to any disclaimer, the term of this patent is extended or adjusted under 35 U.S.C. 154(b) by 0 days.

(21) Appl. No.: 17/501,492

(22) Filed: Oct. 14, 2021

(65) Prior Publication Data
US 2022/0033067 A1 Feb. 3, 2022

Related U.S. Application Data

(63) Continuation of application No. PCT/US2020/041018, filed on Jul. 7, 2020.

(60) Provisional application No. 62/871,469, filed on Jul. 8, 2019.

(51) Int. Cl.
| | |
|---|---|
| *B64C 39/10* | (2006.01) |
| *B64D 29/04* | (2006.01) |
| *B64C 21/02* | (2006.01) |
| *B64D 33/04* | (2006.01) |
| *B64D 33/02* | (2006.01) |

(52) U.S. Cl.
CPC ............ *B64C 21/025* (2013.01); *B64C 39/10* (2013.01); *B64D 29/04* (2013.01); *B64D 33/02* (2013.01); *B64D 33/04* (2013.01); *B64C 2039/105* (2013.01); *B64D 2033/0226* (2013.01)

(58) Field of Classification Search
CPC . B64C 21/025; B64C 39/10; B64C 2039/105; B64D 29/04; B64D 33/02; B64D 33/04; B64D 2033/0226
See application file for complete search history.

(56) References Cited

U.S. PATENT DOCUMENTS

| | | | |
|---|---|---|---|
| 6,527,224 B2 | 3/2003 | Seidel | |
| 6,543,718 B2 | 4/2003 | Provost | |
| 9,126,679 B2 | 9/2015 | Lippinois et al. | |
| 2002/0134886 A1* | 9/2002 | Seidel | F02K 3/04 |
| | | | 244/53 B |
| 2003/0132342 A1* | 7/2003 | Koncsek | F02C 7/042 |
| | | | 244/53 B |

(Continued)

FOREIGN PATENT DOCUMENTS

| | | | |
|---|---|---|---|
| WO | 2008017567 | 2/2008 | |
| WO | WO-2008017567 A1 * | 2/2008 | ............ B64D 33/02 |
| WO | 2021007216 | 1/2021 | |

OTHER PUBLICATIONS

Daggett et al, Blended Wing Body Systems Studies: Boundary Layer Ingestion Inlets with Active Flow Control, Dec. 31, 2003.

(Continued)

*Primary Examiner* — Tye William Abell
(74) *Attorney, Agent, or Firm* — Caldwell Intellectual Property Law

(57) ABSTRACT

Technologies are described herein for a drag recovery scheme using a boundary layer bypass duct system. In some examples, boundary layer air is routed around the intake of one or more of the engines and reintroduced aft of the engine fan in the nozzle duct in a mixer-ejector scheme. Mixer-ejectors mix the boundary layer flow to increase mass flow.

18 Claims, 5 Drawing Sheets

(56) References Cited

U.S. PATENT DOCUMENTS

| | | | | |
|---|---|---|---|---|
| 2004/0251378 A1* | 12/2004 | Bagnall | ............... | B64D 33/02 |
| | | | | 244/53 B |
| 2005/0178884 A1* | 8/2005 | Schafroth | ............... | B64C 3/10 |
| | | | | 244/36 |
| 2016/0122005 A1* | 5/2016 | Florea | ............... | B64D 29/04 |
| | | | | 244/53 B |
| 2020/0331591 A1* | 10/2020 | Page | ............... | B64D 27/14 |

OTHER PUBLICATIONS

Agile, Use Case—Blended Wing Body (boundary layer ingestion), Oct. 19, 2019.

\* cited by examiner

DRAG RECOVERY SCHEME USING BOUNDARY LAYER INGESTION

CROSS-REFERENCE TO RELATED APPLICATIONS

This application is a continuation of and claims priority to International Application No. PCT/US2020/041018 filed on Jul. 7, 2020 and entitled "DRAG RECOVERY SCHEME USING BOUNDARY LAYER INGESTION," the entirety of which is incorporated herein by reference. The international application claims the benefit of priority of U.S. Provisional Patent Application Ser. No. 62/871,469, filed on Jul. 8, 2019, which is incorporated by reference herein in its entirety.

FIELD OF THE INVENTION

The present invention generally relates to the field of aircraft propulsion. In particular, the present invention is directed to drag recovery scheme using boundary layer ingestion.

BACKGROUND

Blended wing body aircraft have great potential for increasing efficiency of air travel, as a result of the shape of the blended wing body. However, in some cases, positioning of engines on blended wing body aircraft may require large heavy pillars to place the engine far away from the blended wing body and prevent the engine from receiving boundary layer air.

SUMMARY OF THE DISCLOSURE

Technologies are described herein for a drag recovery scheme using a boundary layer bypass duct system. In some examples, boundary layer air is routed around the intake of one or more of the engines and reintroduced aft of the engine fan in the nozzle duct in a mixer ejector scheme. Mixer-ejectors mix the boundary layer flow to increase mass flow.

In an aspect, a blended wing body aircraft includes a blended wing body, at least one fan housed within a nacelle, at least one bypass intake duct configured to receive boundary layer air from a top surface of the blended wing body, the at least one bypass intake duct located proximate to a fan intake of the at least one fan, at least one bypass exhaust duct located proximate to a fan exhaust of the at least one fan, and a passageway, located substantially between the blended wing body and the at least one fan, fluidically connecting the at least one bypass intake duct with the at least one bypass exhaust duct and configured to direct the boundary layer air from the at least one bypass intake duct to the at least one bypass exhaust duct.

In another aspect, a method of reducing drag on an aircraft including a blended wing body, and at least one fan housed within a nacelle, wherein the method includes receiving, by at least one bypass intake duct, boundary layer air from a top surface of the blended wing body, the at least one bypass intake duct located proximate to a fan intake of the at least one fan, fluidically connecting, by a passageway located substantially between the blended wing body and the at least one fan, the at least one bypass intake duct with at least one bypass exhaust duct located proximate to a fan exhaust of the at least one fan, and directing, by the passageway, the boundary layer air from the at least one bypass intake duct to the at least one bypass exhaust duct.

These and other aspects and features of non-limiting embodiments of the present invention will become apparent to those skilled in the art upon review of the following description of specific non-limiting embodiments of the invention in conjunction with the accompanying drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
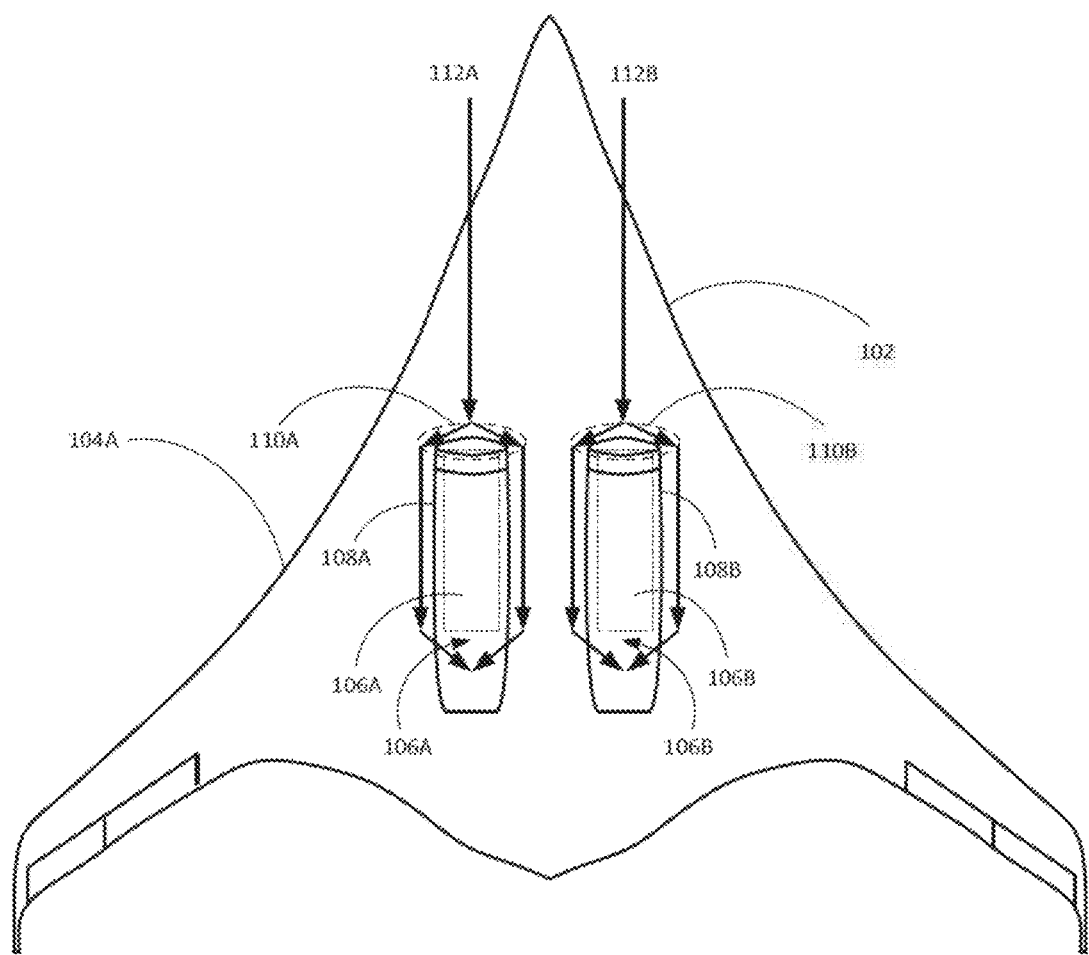
FIG. 1 is a side-view illustration of a blended wing body ("BWB") aircraft using a boundary layer bypass duct system, according to various examples described herein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Conventional aircraft typically consist of a so-called "tube and wing" configuration, or, a blended-wing body ("BWB") configuration, where there is no clear delineation between the wings and the main body of the aircraft. When in flight, various layers of air flow form along the length of the fuselage. Closer to the fuselage, a boundary layer develops. The boundary layer is the part of the flow near the surface of the fuselage where friction slows down the local flow. Directly at the wall of the body, flow speed is zero and increases as the distance from the surface of the fuselage increases.

Boundary layer ingestion ("BLI") has been studied as a means to reduce overall airplane energy consumption by accelerating the slow wake to make thrust versus accelerating freestream flow at full flight velocity. Thrust is generated by a given accelerated a given mass flow by a given difference in velocity ("$\Delta v$"). The energy consumed varies with the given mass flow and the $\Delta v$ squared. By incorporating slower inflow to the engine an energy improvement is realized.

Today, studies of jet engine BLI have been confined to BLI at the face of the engine exposing the fan to turbulent flow with a large speed difference with the rest of the inflow. This may make it difficult to design a fan blade that can tolerate the large inflow angle changes and tolerate the high loads and vibration it causes. Further, as the aircraft increases airspeed, the various turbulent flows and the boundary layer become increasing complex to design for, resulting in a fan blade design that may be very efficient at one airspeed but inefficient at other airspeeds, or a fan blade with mediocre efficiency over a wide range of airspeeds.

It is with respect to these and other considerations that the disclosure made herein is presented.

The following detailed description is directed to technologies for a drag recovery scheme using boundary layer bypass duct system. As noted above, in some examples, a BWB aircraft can include one or more nacelles that house a jet engine. In some examples, the nacelles abut (or are installed onto) a top surface of the aircraft. In other examples, the nacelles are partially within the aircraft and partially outside of the aircraft ("partially hidden"). Partially hidden means that that the nacelles are partially below the surface of the aircraft.

When the BWB aircraft is moving through the air at some velocity through the use of the one or more jet engines ("main engines"), a boundary layer of air forms on the aircraft. All other factors being equal, the boundary layer forms along the entire length of the aircraft. The boundary layer represents slow or stagnant air along the surface of the aircraft, and thus, represents a force of drag while the aircraft is in motion.

In various types of aircraft in which the intake of the engine is in line with the movement of some layers of the boundary layer, such as a semi-buried nacelle, the engine design may be used to try to use some of that boundary layer air. As noted above, in some examples, some conventional engines use modified fan blades that are designed to pull in at least a portion of the boundary layer air and use the air in the engine. A problem with this approach is that, due to the changing turbulent nature of the boundary layer air at difference speeds, the fan blades can be designed either for optimal efficiency at a single aircraft speed or a moderate efficiency over a range of aircraft speeds. While providing some increased efficiency at certain airspeeds, the use of the boundary layer air in the intake can actually reduce the efficiency of the engine at speeds for which the fan blades were not designed to be optimal.

In examples of the presently disclosed subject matter, instead of introducing boundary air into the intake of the engine, the engine is designed with a bypass duct system that pulls the boundary air around the engine, reintroducing the boundary air aft of the engine fan in the nozzle duct in a mixer-ejector scheme. Mixer-ejectors mix the bypassed external flow in a duct to increase mass flow and reduce the delta-V to make approximately equivalent thrust.

The slow-moving air introduced into the wake of the airframe can be an ideal source, even at high airplane flight speeds. The airframe boundary-layer (wake) is ducted to the inside of the fan nozzle behind the fan where it will preferably cause little no vibration or noise penalty. The slot that introduces this flow can be optimally several slot heights upstream of the nozzle exit to achieve full effect. In some examples, the boundary layer on the top surface of the aircraft and the bottom surface of the aircraft can be introduced into the bypass duct, increasing the benefit.

While the presently disclosed subject matter may be described with respect to what is termed as examples, embodiments, and the like, it is understood that the presently disclosed system is not limited to the disclosed embodiments.

FIG. 1 is a side-view illustration of a blended wing body ("BWB") aircraft 100, according to various examples described herein. The BWB aircraft includes a fuselage 102. The fuselage includes a port wing 104A and a starboard wing 104B. To propel the aircraft 100, the aircraft includes main engine 106A housed within nacelle 108A and main engine 106B housed within nacelle 108B. The main engines 106A and/or 106B may be various types of engines, including, but not limited to, turbojet, turboprop, turbofan, and turboshaft. As used herein, "nacelle" 108A and 108B is a housing, separate from fuselage 102, that holds a flight component, such as main engines 106A and 106B, respectively. It should be noted that although the presently disclosed subject matter is described in terms of a two-engine BWB aircraft, aircraft 100, examples of the presently disclosed subject matter may be used with other numbers of main engines, or other equipment, and are considered to be within the scope of the presently disclosed subject matter.

The aircraft 100 further includes intake ducts 110A and 110B. The intake ducts 110A and 110B receive boundary air 112A and 112B, move the boundary air 112A and 112B around the main engines 106A and 106B and nacelles 108A and 108B, respectively, and reintroduces the boundary air 112A into an exhaust flow 114A of main engine 106A and an exhaust flow 114B of the main engine 106B. The movement of the boundary air 112A and 112B may be accomplished using a duct internal, external, or partially internal and partially external to the nacelles 108A and 108B. It should be noted that the presently disclosed subject matter does not require that the boundary air 112A or 112B comprise all boundary air flow that may exist, as some boundary air may still flow through a main engine intake.

Figure 2:
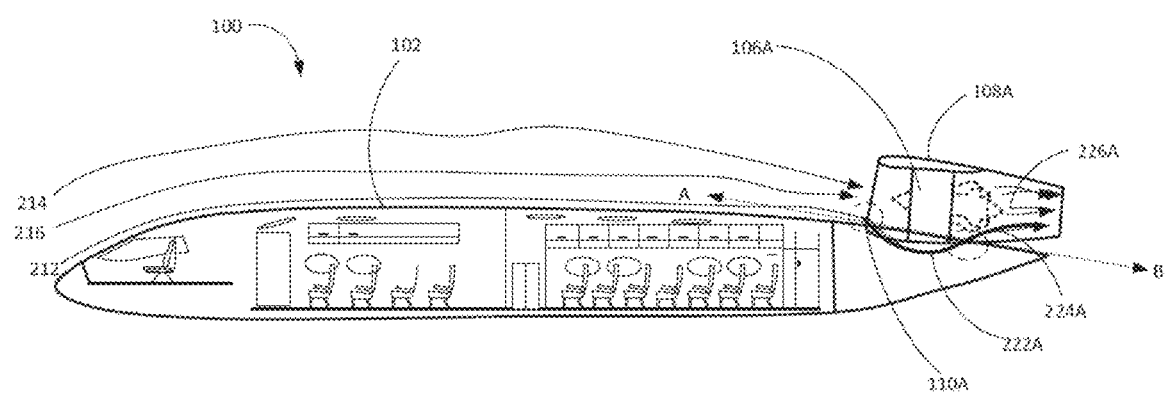
FIG. 2 is a side-view illustration of a boundary layer bypass duct system, according to various examples described herein.

FIG. 2 is a side-view illustration of the aircraft 100. In FIG. 2, the fuselage 102 is illustrated with the main engine 106A and nacelle 108A. As illustrated, a part of the nacelle 108A of the main engine 106A is partially below a surface plane AB of the fuselage 102, sometimes referred to as a "partially-buried" or "semi-buried" nacelle. It should be understood that this is merely an example, as the presently disclosed subject matter may be used with fully or non-buried nacelles/engines.

Illustrated in FIG. 2 are three airflows. Proximal airflow 212 generally represents the boundary layer air that forms on and proximate to the outer layer of the fuselage 102. Distal airflow 214 generally represents free air that flows outside of the proximal airflow 212. The intermediate airflow 216 generally represents an interface between the proximal airflow 212 and the distal airflow 214. It should be noted that the airflows 212, 214, and 216 are not drawn to any particular scale. Further, it should be noted that the air represented by the airflows 212, 214, and 216 do not have exact or clearly definable layers.

As illustrated, the proximal airflow 212 (generally representing the boundary layer air) is introduced into the intake duct 110A, moved through passageway 222A, and is exhausted through an exhaust duct 224A, shown in more detail below. Although not beholden to one scientific principle, it is understood that turbulent entrainment of the proximal airflow 212 essentially "pulls" the airflow 212 into the passageway 222A and the exhaust duct 224A. In the exhaust 226A of the main engine 106A, the faster flow of the exhaust 226A is slowed, and the slower flow of the proximal airflow 212 is sped up in a "turbulent mixing" cone. The increasing of the velocity of the proximal airflow 212 creates a vacuum, pulling airflow 212 into the passageway 222A. The reduction in pressure in the passageway 222A (causing the pulling of the proximal airflow 212 into the passageway 222A) can be felt at the intake duct 110A, reducing the pressure buildup of stagnant boundary layer air, increasing thrust.

In a different manner than can be found in conventional aircraft, the beneficial effects of the partial vacuum in the passageway 222A generally increases as the speed of the aircraft 100 increases due to increased main engine 106A thrust. With higher main engine 106A thrust, the velocity of the exhaust 226A increases. Because the velocity of the proximal airflow 212 is essentially constant, as the velocity of the exhaust 226A increases, the differential pressure created in the "turbulent mixing" cone in the exhaust 226A increases, thus increasing the amount of the proximal airflow 212 pulled into the exhaust 226A and the accompanying benefits. At some general location downstream of the aircraft 100, the proximal airflow 212 and the exhaust 226A are completely mixed, with constant pressure and turbulent flow. Other types of mechanisms may be used to introduce the proximal airflow 212, such as, but not limited to, venturi valves and the like.

Figure 3:
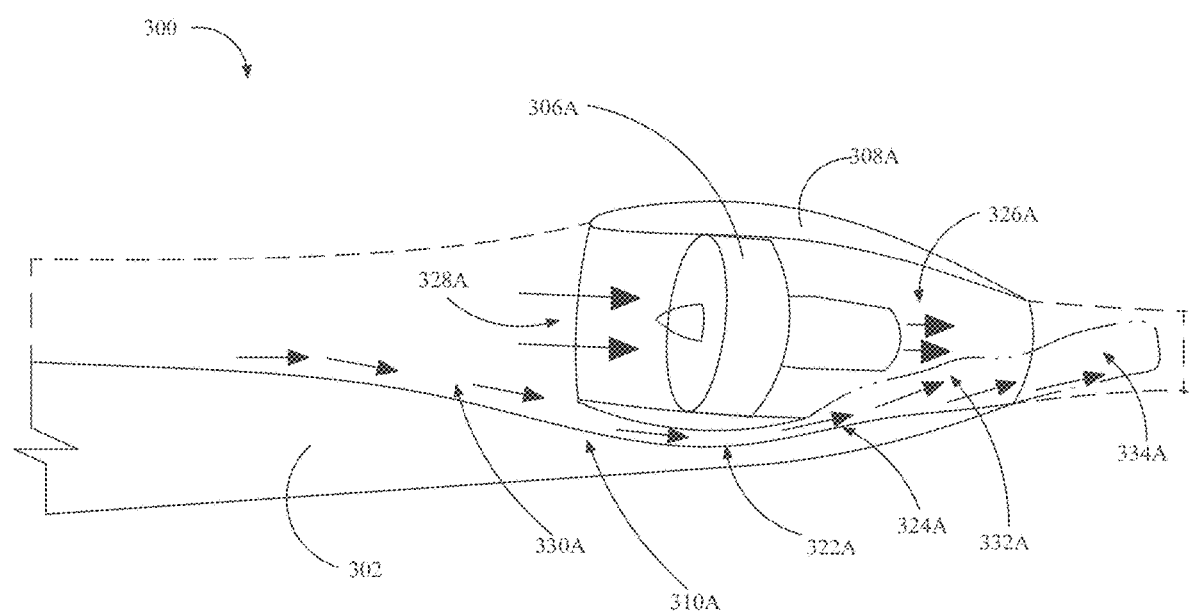
FIG. 3 is a side-view illustration of a boundary layer bypass duct system using multiple ducts, according to various examples described herein.

FIG. 3 is a close-up, side-view illustration of a bypass duct system. In FIG. 3, the fuselage 302 of the aircraft 300 includes a main engine 306A housed within a nacelle 308A. The configuration illustrated in FIG. 3 is a semi- or partial-buried nacelle configuration. The fuselage 302 further includes an intake duct 310A located proximate to the intake side of the main engine 306A, a passageway 322A, and an exhaust duct 324A, which opens to the exhaust 326A of the main engine 306A. The intake duct 310A is located proximate to an intake 328A of the main engine 306A. The passageway 322A fluidically connects the intake duct 310A with the exhaust duct 324A to provide for an air passage from the intake duct 310A to the exhaust duct 324A.

The intake duct 310A is located proximate to the nacelle 308A and in line with or in the boundary layer air 330A proximate to the intake 328A. The boundary layer air 330A is introduced through the intake ducts 310A, moved through the passageway 322A, and is exhausted into the exhaust 326A through the exhaust duct 324A. The exhausted boundary layer air 332A mixes with the exhaust 326A in mixing region 334A. In some examples, the exhausted boundary layer air 332 is introduced into the exhaust 326A within the nacelle 308A.

Figure 4:
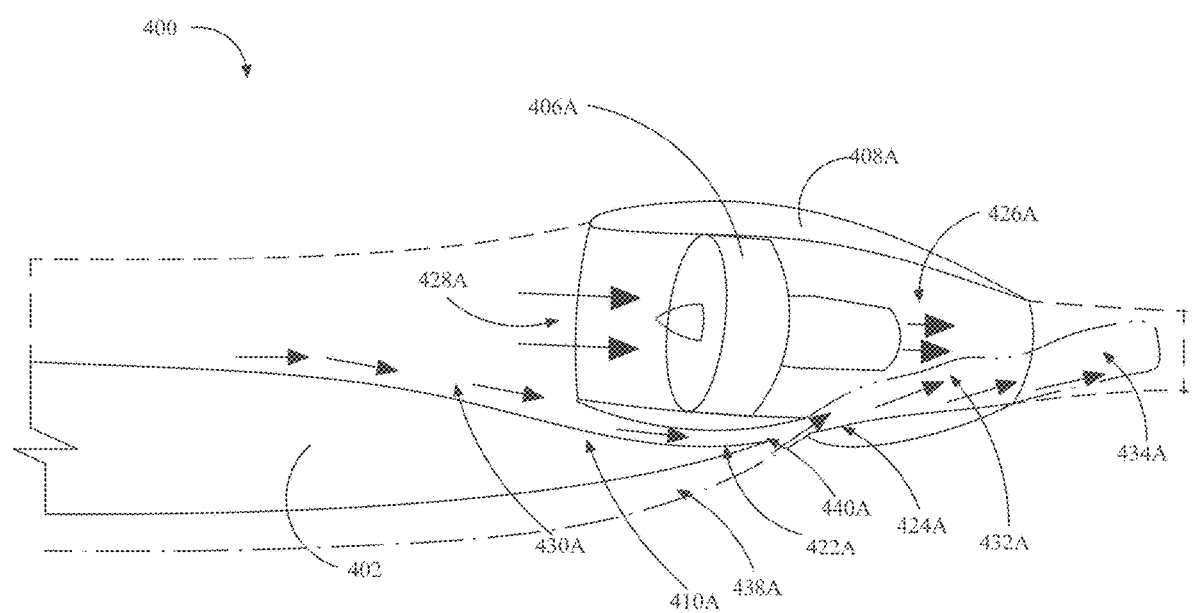
FIG. 4 is a side-view illustration of a boundary layer bypass duct system using an extended nacelle, according to various examples described herein.

FIG. 4 is a close-up, side-view illustration of a dual bypass duct system. In FIG. 4, the fuselage 402 of the aircraft 400 includes a main engine 406A housed within a nacelle 408A. The configuration illustrated in FIG. 4 is a semi- or partial-buried nacelle configuration. The fuselage 402 further includes an upper intake duct 410A, a passageway 422A, and an exhaust duct 424A, which opens to the exhaust 426A of the main engine 406A.

The upper intake duct 410A is located proximate to an intake 428A of the main engine 406A. The upper intake duct 410A is further located proximate to the nacelle 408A and in line with or in an upper boundary layer air 430A proximate to the intake 428A. The upper boundary layer air 430A is introduced through the upper intake duct 410A, moved through the passageway 422A, and is exhausted into the exhaust 426A through the exhaust duct 424A. The exhausted upper boundary layer air 432A mixes with the exhaust 426A in mixing region 434A. In some examples, the exhausted boundary layer air 432A is introduced into the exhaust 426A within the nacelle 408A.

The fuselage 402 further includes a secondary intake duct 436A. The secondary intake duct 436A receives secondary boundary layer air 438B located proximate to a second layer of the fuselage 402. In the example illustrated in FIG. 4, the secondary intake duct 436A is located proximate to the lower surface of the fuselage 402. The secondary boundary layer air 438A is introduced through the secondary intake duct 436A, moved through a passageway 440A, and is exhausted into the exhaust 426A through the exhaust duct 424A. The exhausted secondary boundary layer air 442A mixes with the exhaust 426A in mixing region 434A. In some examples, the exhausted secondary boundary layer air 442A is introduced into the exhaust 426A within the nacelle 408A.

Figure 5:
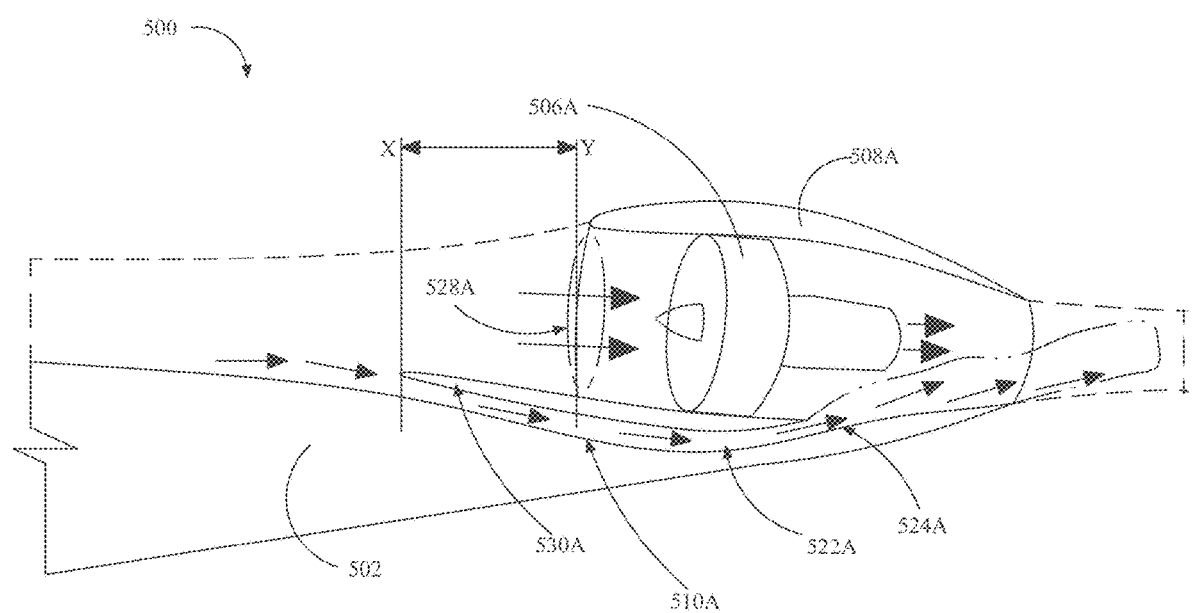
FIG. 5 is a front-view illustration of an extended inlet for a boundary layer bypass duct system, according to various examples described herein.

FIG. 5 is a close-up, side-view illustration of a bypass duct system with an extended bypass intake. In FIG. 5, the fuselage 502 of the aircraft 500 includes a main engine 506A housed within a nacelle 508A. The configuration illustrated in FIG. 5 is a semi- or partial-buried nacelle configuration. The fuselage 502 further includes an upper intake duct 510A, a passageway 522A, and an exhaust duct 524A.

In FIG. 5, the upper intake duct 510A is located a distance XY from an intake 528A of the main engine 506A using an intake extender 530A. The intake extender 530A increases the distance from the intake 528A of the main engine 506A and the intake of the upper intake duct 510A. Locating the upper intake duct 510A from the intake 528A of the main engine 506A can provide various benefits. For example, the partial vacuum created by the mixing in the exhaust of the engine (described above) can be felt further closer to the bow (or front) of the aircraft 500, potentially reducing the drag effect of the boundary air.

Based on the foregoing, it should be appreciated that technologies for a drag recovery scheme using boundary layer bypass duct system have been disclosed herein. It is to be understood that the invention defined in the appended claims is not necessarily limited to the specific features or acts described herein. Rather, the specific features or acts are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, aspects of which are set forth in the following claims.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft, comprising:
a blended wing body;
at least one fan housed within a nacelle;
at least one bypass intake duct configured to receive boundary layer air from a top surface of the blended wing body, the at least one bypass intake duct located proximate to a fan intake of the at least one fan;
at least one bypass exhaust duct located proximate to a fan exhaust of the at least one fan; and
a passageway, located substantially between the blended wing body and the at least one fan, fluidically connecting the at least one bypass intake duct with the at least one bypass exhaust duct and configured to direct the boundary layer air from the at least one bypass intake duct to the at least one bypass exhaust duct;
a second bypass intake duct configured to receive second boundary layer air from a bottom surface of the blended wing body;
a second bypass exhaust duct located proximate to the fan exhaust of the at least one fan; and
a second passageway fluidically connecting the second bypass intake duct with the second bypass exhaust duct and configured to direct the second boundary layer air from the second bypass intake duct to the second bypass exhaust duct.

2. The aircraft of claim 1, wherein the nacelle is semi-buried.

3. The aircraft of claim 1, further comprising:
a second fan housed within a second nacelle;
a second bypass intake duct configured to receive a second boundary layer air from the top surface of the blended wing body, the second bypass intake duct located proximate to a second fan intake of the second fan;
a second bypass exhaust duct located proximate to a second fan exhaust of the second fan; and
a second passageway fluidically connecting the second bypass intake duct with the second bypass exhaust duct and configured to direct the second boundary layer air from the second bypass intake duct to the second bypass exhaust duct.

4. The aircraft of claim 1, further comprising a bypass intake extender configured to increase a distance from the fan intake of the at least one fan and the at least one bypass intake duct.

5. The aircraft of claim 1, wherein the at least one bypass exhaust duct is configured to output the boundary layer air into the fan exhaust of the at least one fan.

6. The aircraft of claim 5, wherein the at least one bypass exhaust duct is configured to mix the boundary layer air and the fan exhaust of the at least one fan using a turbulent mixing cone.

7. The aircraft of claim 5, wherein the boundary layer air exits the at least one bypass exhaust duct into a mixing region in the fan exhaust of the at least one fan.

8. The aircraft of claim 5, wherein the at least one bypass exhaust duct has a duct height and the at least one bypass exhaust duct is located a distance no less than the duct height from a nozzle exit within a nozzle of the at least one fan.

9. The aircraft of claim 8, wherein the mixing region is within the nacelle.

10. A method of reducing drag of an aircraft, comprising a blended wing body, and at least one fan housed within a nacelle, wherein the method comprises:
receiving, by at least one bypass intake duct, boundary layer air from a top surface of the blended wing body, the at least one bypass intake duct located proximate to a fan intake of the at least one fan;
fluidically connecting, by a passageway located substantially between the blended wing body and the at least one engine, the at least one bypass intake duct with at least one bypass exhaust duct located proximate to a fan exhaust of the at least one fan;
directing, by the passageway, the boundary layer air from the at least one bypass intake duct to the at least one bypass exhaust duct;
receiving, by a second bypass intake duct, second boundary layer air from a bottom surface of the blended wing body;
fluidically connecting, by a second passageway, the second bypass intake duct with a second bypass exhaust duct located proximate to the fan exhaust of the at least one fan; and
directing, by the second passageway, the second boundary layer air from the second bypass intake duct to the second bypass exhaust duct.

11. The method of claim 10, wherein the nacelle is semi-buried.

12. The method of claim 10, wherein the aircraft further comprises a second fan housed within a second nacelle, and the method further comprises:
receiving, by a second bypass intake duct, a second boundary layer air from the top surface of the blended wing body, the second bypass intake duct located proximate to a second fan intake of the second fan;
fluidically connecting, by a second passageway, the second bypass intake duct with a second bypass exhaust duct located proximate to a second fan exhaust of the second fan; and
directing, by the second passageway, the second boundary layer air from the second bypass intake duct to the second bypass exhaust duct.

13. The method of claim 10, further comprising increasing, by a bypass intake extender, a distance from the fan intake of the at least one fan and the at least one bypass intake duct.

14. The method of claim 10, further comprising outputting, by the at least one bypass exhaust duct, the boundary layer air into the fan exhaust of the at least one fan.

15. The method of claim 14, further comprising, mixing, by the at least one bypass exhaust duct, the boundary layer air and the fan exhaust of the at least one fan using a turbulent mixing cone.

16. The method of claim 14, wherein the boundary layer air exits the at least one bypass exhaust duct into a mixing region in the fan exhaust of the at least one fan.

17. The method of claim 14, wherein the at least one bypass exhaust duct has a duct height and the at least one bypass exhaust duct is located a distance no less than the duct height from a nozzle exit within a nozzle of the at least one fan.

18. The method of claim 17, wherein the mixing region is within the nacelle.

* * * * *